(12) United States Patent
Sato et al.

(10) Patent No.: US 9,843,206 B2
(45) Date of Patent: Dec. 12, 2017

(54) TRANSFORMER LESS BATTERY CHARGER SYSTEM

(71) Applicant: Renesas Electronics America Inc., Santa Clara, CA (US)

(72) Inventors: Tetsuo Sato, San Jose, CA (US); Shigeru Maeta, San Jose, CA (US); Toshio Kimura, Cupertino, CA (US); Atsushi Mitamura, Tokyo (JP); Akira Negishi, Gunma-ken (JP); Gary S. Jacobson, Norwalk, CT (US)

(73) Assignee: Renesas Electronics America Inc., Santa Clara, CA (US)

( * ) Notice: Subject to any disclaimer, the term of this patent is extended or adjusted under 35 U.S.C. 154(b) by 144 days.

(21) Appl. No.: 14/851,433

(22) Filed: Sep. 11, 2015

(65) Prior Publication Data

US 2017/0077729 A1    Mar. 16, 2017

(51) Int. Cl.
*H02J 7/02* (2016.01)
*H02J 7/00* (2006.01)

(52) U.S. Cl.
CPC .......... *H02J 7/0045* (2013.01); *H02J 7/0029* (2013.01); *H02J 7/022* (2013.01)

(58) Field of Classification Search
CPC ......... H02M 3/33523; H02M 3/33507; H02M 1/32; H02M 2001/0009; H02M 3/3376; H02M 3/00; Y02T 10/7005; Y02T 10/7216; H02J 7/0054; H02J 3/32
See application file for complete search history.

(56) References Cited

U.S. PATENT DOCUMENTS

| | | | | |
|---|---|---|---|---|
| 2013/0026836 A1* | 1/2013 | Dighrasker | ......... | H02M 3/1582 307/66 |
| 2013/0093394 A1* | 4/2013 | Iyasu | ................. | B60L 11/1811 320/109 |
| 2015/0036389 A1* | 2/2015 | Freeman | ................. | H02M 1/10 363/16 |

* cited by examiner

*Primary Examiner* — Nghia Doan
(74) *Attorney, Agent, or Firm* — Campbell Stephenson LLP

(57) ABSTRACT

A transformer less battery charger system. In one embodiment, the battery charger system includes input terminals for receiving an AC voltage, output terminals for receiving terminals of a rechargeable battery pack, and a non-isolated DC-DC converter coupled between the input terminals and the output terminals. A device is also coupled somewhere between the input terminals and the output terminals. The device is configured to selectively and indirectly couple the input terminals to the output terminals. More particularly, the device indirectly couples the input terminals to the output terminals when the rechargeable battery pack terminals are received by the output terminals, and the device indirectly decouples the input terminals from the output terminals when the rechargeable battery pack terminals are separated from the output terminals.

13 Claims, 8 Drawing Sheets

TRANSFORMER LESS BATTERY CHARGER SYSTEM

BACKGROUND

Rechargeable battery packs are used in portable devices. Cordless electric tools, for example, run on rechargeable battery packs that contain several lithium ion battery cells. Lithium ion is often the chemistry of choice for rechargeable battery packs because of its high capacity-to-size ratio and low self-discharge characteristics. The present invention will be described with reference to a battery charger system for charging or recharging a lithium ion battery pack, it being understood the present invention should not be limited thereto.

Lithium ion battery cells are charged or recharged in a process (hereinafter referred to as the "charging process") that consists of three consecutive stages: a pre-charge stage, a quick charge-constant current (QC/constant-current) stage, and a quick charge-constant voltage (QC/constant-voltage) stage. During the first or pre-charge stage, a battery charger system charges a cell with a constant, low charge direct current (DC) current. When the voltage across the cell reaches a threshold (e.g., 2.8V), the pre-charge stage should stop, and the QC/constant-current stage should start. During QC/constant-current stage the battery charger system charges the cell with a constant, high charge DC current until the cell voltage reaches another threshold (e.g. 4.1V). When this threshold is reached, the QC/constant-current stage should end, and the QC/constant-voltage stage should start. During the QC/constant-voltage stage the battery charger system charges the cell at a fixed voltage (e.g., 4.1V). While the cell is charged during the last stage, the charging current should continuously fall. When the charging current falls below a threshold, the charging process should stop. Battery charger systems often include a microcontroller unit (MCU) that implements the charging process described above in accordance with an embedded program.

SUMMARY

A transformer less battery charger system. In one embodiment, the battery charger system includes input terminals for receiving an AC voltage, output terminals for receiving terminals of a rechargeable battery pack, and a non-isolated DC-DC converter coupled between the input terminals and the output terminals. A device is also coupled somewhere between the input terminals and the output terminals. The device is configured to selectively and indirectly couple the input terminals to the output terminals. More particularly, the device indirectly couples the input terminals to the output terminals when the rechargeable battery pack terminals are received by the output terminals, and the device indirectly decouples the input terminals from the output terminals when the rechargeable battery pack terminals are separated from the output terminals.

BRIEF DESCRIPTION OF THE DRAWINGS

The present invention may be better understood in its numerous objects, features, and advantages made apparent to those skilled in the art by referencing the accompanying drawings.

The use of the same reference symbols in different drawings indicates similar or identical items.

DETAILED DESCRIPTION

Figure 1:
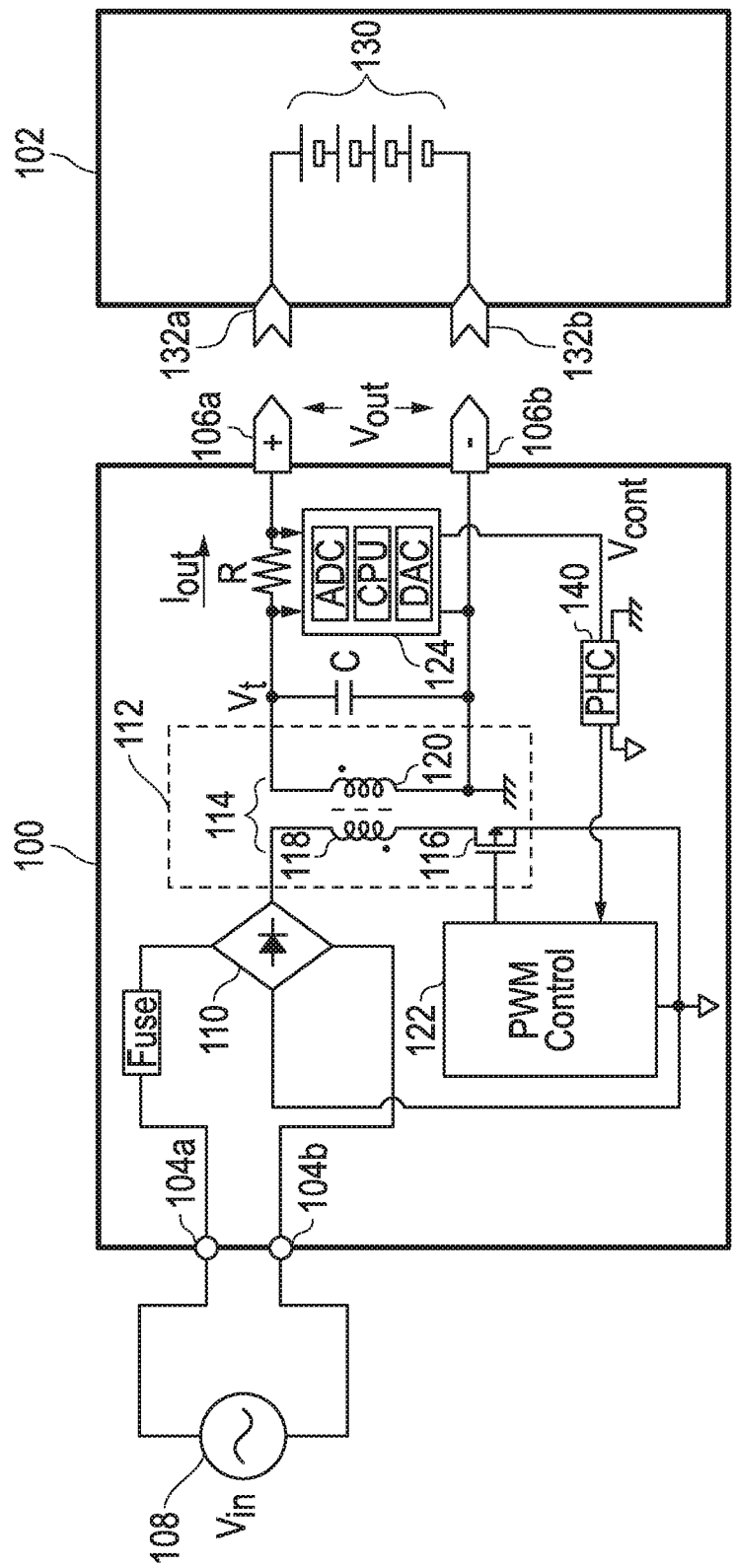
FIG. 1 is a diagram illustrating an example battery charger system employing a transformer.

FIG. 1 illustrates several components of an example battery charger 100 for charging or recharging a battery pack 102. Only relevant components of battery chargers and battery packs are shown within the Figures in order to explain basic operations thereof.

Battery charger 100 includes a pair of input terminals 104, a pair of output terminals 106 and components therebetween. Input terminals 102 are coupled to receive a high voltage (e.g., 120V) AC input from an external source 108. Battery charger 100 converts the high voltage AC input into a low voltage DC output (i.e, Vout and Iout) at terminals 106. The low voltage DC output is controlled in accordance with the three-stage charging process described above. In other words, battery charger 100 adjusts Iout and Vout in accordance with the process described above while charging battery pack 102.

Between input terminals 104 and output terminals 106 are various components for converting the high voltage AC input into the low voltage DC output. A diode bridge rectifier 110 is coupled to input terminals 104 as shown. A diode bridge rectifier is an arrangement of four or more diodes in a bridge circuit. The diode bridge rectifier is used for rectifying an AC input into a DC output. DC is the unidirectional flow of electric charge. DC includes constant average DC over time. In the embodiment of FIG. 1, bridge rectifier 110 is coupled to input terminals 104 via a fuse. In an alternative embodiment, bridge rectifier 110 may be directly coupled to input terminals 104, or bridge rectifier 110 may be coupled to input terminals 104 via additional components.

A DC-DC converter is a circuit that converts a source DC from one voltage level to another. Battery charger 100 includes an isolated DC-DC converter 112. "Isolation" describes the electrical separation between the input and output of the DC-DC converter. An isolated DC-DC converter typically uses a transformer to eliminate the DC path between its input and output. In contrast, a non-isolated DC-DC converter has a DC path between its input and output.

Isolated DC-DC converter 112 includes a step-down transformer 114 and a transistor (e.g. MOSFET) 116. The output of DC-DC converter 112 is coupled to output terminals 106 via resistor R and capacitor C as shown. A control circuit 122 controls DC-DC converter 112. In one embodiment, control circuit 122 generates a pulse width modulated (PWM) signal that controls transistor 116, which in turn controls current flow through transformer 114. Control circuit 122 can control the magnitude of Iout and/or Vout by adjusting the duty cycle of the PWM signal. In other words, the magnitude of Iout and/or Vout depends on the duty cycle of the PWM signal.

In one embodiment control circuit 122 receives a control voltage Vcont from MCU 124 via photo coupler 140. MCU 124 monitors Vout and Iout and adjusts Vcont in accordance with the charging process described above. The control circuit 122 adjusts the duty cycle of the PWM signal based on Vcont. In this manner MCU 124 indirectly adjusts the duty cycle of the PWM signal, and thus Iout and/or Vout, to implement the three-stage charging process described above.

Transformer 114 provides DC isolation of output terminals 106. Photo coupler 140 is employed to maintain isolation of the output terminals 106. The isolation protects a user from receiving an electric shock should the user inadvertently come into contact with an output terminal 106. However, transformers like that shown in FIG. 1 can be expensive, heavy, and large in size. Photo coupler 140 adds to the overall cost and complexity.

Figure 2:
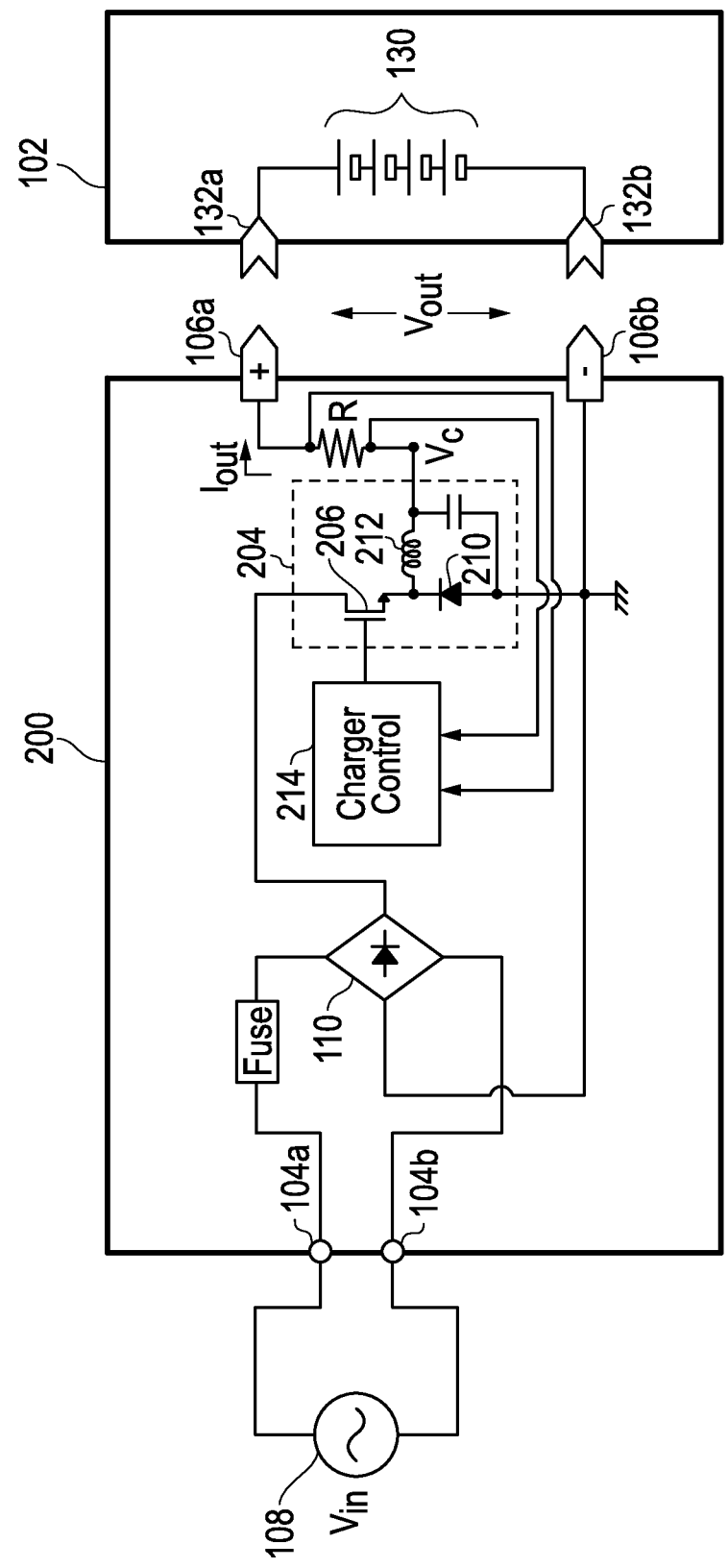
FIG. 2 is a diagram illustrating an example transformer less based battery charger system.

FIG. 2 shows an alternative battery charger 200 for charging battery pack 102. Battery chargers 100 and 200 share many of the same components, but several distinctions exist. For example, the isolated DC-DC converter 112 of battery charger 100 is replaced with a step down, non-isolated DC-DC converter 204 such as a buck converter. A buck converter is one example of a non-isolated DC-DC converter, it being understood that alternative non-isolated DC-DC converters could be used.

Non-isolated DC-DC converter 204 includes a transistor (e.g., MOSFET) 206 coupled to a diode 210 and inductor 212 as shown. A charger control circuit 214 controls DC-DC converter 204 using feedback from the output thereof. In one embodiment, control circuit 214 generates a PWM signal that controls transistor 206, which in turn controls the output of DC-DC converter 204. Control circuit 214 can adjust Iout and/or Vout provided at output nodes 106 by adjusting the duty cycle of the PWM signal. In one embodiment control circuit 214 includes a MCU that directly or indirectly controls the duty cycle of the PWM signal in accordance with an embedded program that implements the three-stage charging process described above. The MCU (not shown in FIG. 2) receives Vout and Vc, the voltage output of converter 204. The MCU can calculate Iout based on Vout, Vc and the known resistance of resistor R. The MCU monitors Iout and/or Vout. The MCU can adjust Iout and/or Vout during a process for charging battery pack 102. Iout and/or Vout is used to charge or recharge battery pack 102 when it is received by charger 200. Components of the battery charger including the rectifier 110, charger control circuit 214, DC-DC converter 204, resistor R, the fuse, and terminals connected to output terminals 106, may be connected together on a printed circuit board (not shown).

Compared to the isolated DC-DC converter 112 shown in FIG. 1, non-isolated DC-DC converter 204 is smaller in size, smaller in weight, cheaper to manufacture, etc. Unfortunately, non-isolated DC-DC converter 204 does not provide electrical isolation of the output terminals 106. This can create a safety hazard; if a user inadvertently comes into contact with an output terminal 106 while input terminals 104 are coupled to source 108, the user could be injured by an electric shock.

Figure 3:
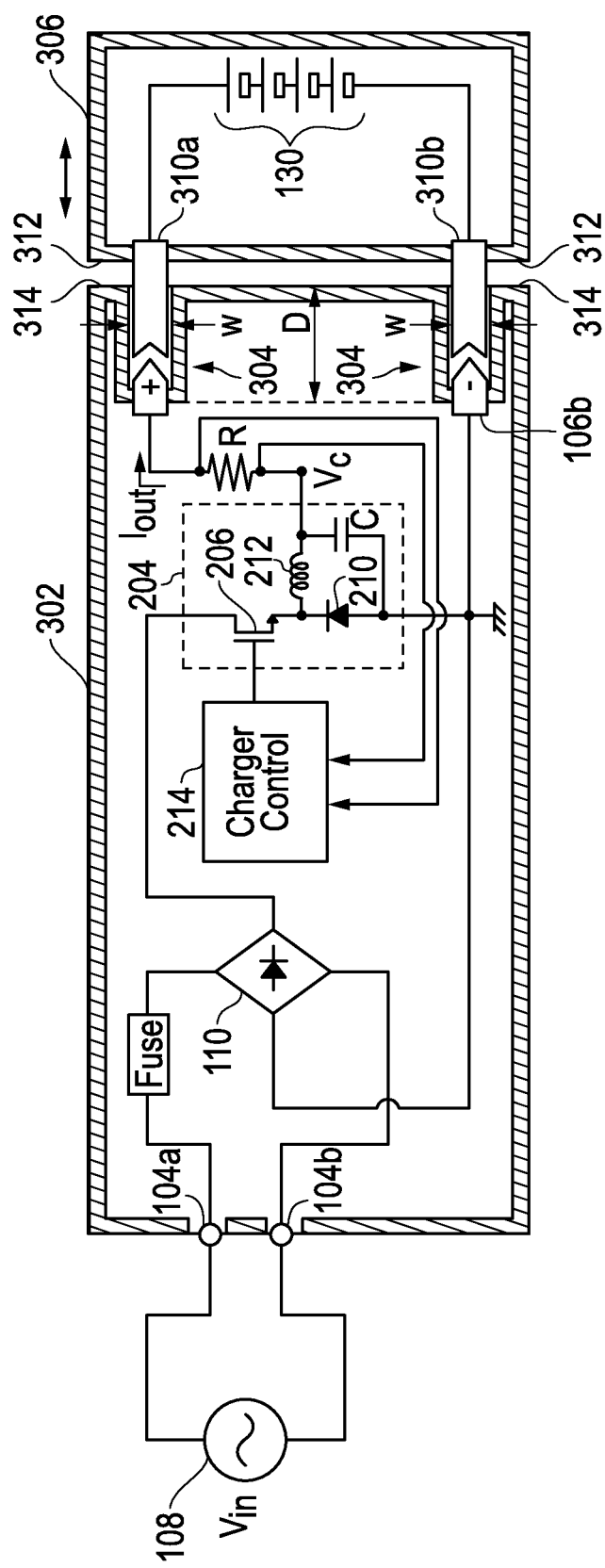
FIG. 3 is a diagram illustrating an example transformer less based battery charger system employing one embodiment of the present invention.
Figure 4:
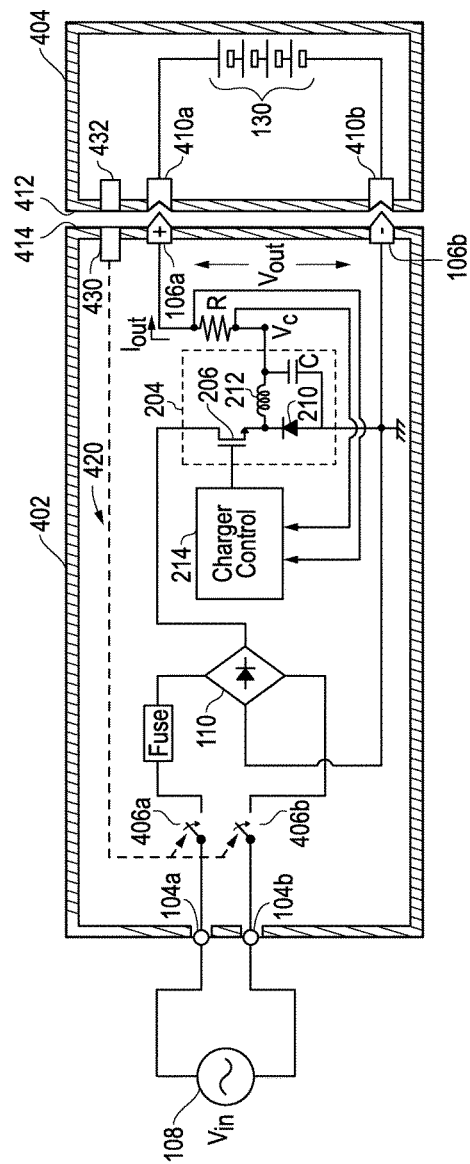
FIG. 4 is a diagram illustrating an example transformer less based battery charger system employing another embodiment of the present invention.

FIGS. 3 and 4 illustrate the battery charger 200 with added safety mechanisms to prevent electric shock. FIG. 3 illustrates the battery charger 200 enclosed within a housing 302 (shown in cross section) made from plastic or other non-conductive material. Output terminals 106 protrude from housing 302, but are fully contained within recesses 304 of housing 302. Recesses 304 are formed with a small width W and/or large depth D that is designed to reduce the chance of user contact with an output terminal 106. Battery pack 102, which is also enclosed in a housing 306 (shown in cross-section) made from plastic or other non-conductive material. Battery pack 102 includes elongated female terminals 310 that are configured to extend into recesses 304 and mate with male output terminals 106. When battery pack 102 is received by battery charger 200, an outer surface 312 of housing 306 engages an outer surface of housing 302, which encloses terminals 310 to prevent inadvertent user contact therewith. When terminals 310 mate with output terminals 106, Iout can flow to and charge lithium ion batteries 130.

FIG. 4 shows an alternative safety mechanism. Like the battery charger 200 shown in FIG. 3, the battery charger 200 of FIG. 4 is enclosed in a housing 402 (shown in cross-section) made of plastic or other non-conductive material. Battery pack 102 is also enclosed in a housing 404 (shown in cross-section) made of plastic or other non-conductive material. The ends of female terminals 410 are essentially flush with an outer surface 412 of housing 404. Male output terminals 106 in FIG. 4 extend from or through housing 402. When battery pack 102 is received by the battery charger of FIG. 4, Iout can flow through mated terminals 106 and 410. In another embodiment, terminals 410 can be replaced with elongated terminals 310 extending from housing 404, and terminals 106 can be contained in recesses of housing 402 like the recesses 304 shown in FIG. 3.

While battery cells 130 are charging, outer surfaces 412 and 414 engage each other, which encloses terminals 106 and 410 to prevent inadvertent user contact. In other words, housings 402 and 404, and terminals 106 and 410 are configured such that when the battery pack is received by the battery charger system, terminals 106 and 410 are not exposed. However, when battery pack 400 is removed, terminals 106 are exposed and present a safety hazard. To prevent inadvertent shock with the output terminals 106, the battery charger includes a pair of switches 406, which selectively couple input terminals 104 to output terminals 106 via rectifier 110 and DC-DC converter 204. In an alternative embodiment, switches 406 can be positioned between rectifier 110 and DC-DC converter 204, or between DC-DC converter 204 and output terminals 106. An actuation system 420 closes switches 406 when battery pack 400 is received by the battery charger, and actuation system 420 opens switches 406 when the battery pack is removed from the battery charger. Thus, the combination of switches 406 and actuation system 420 substantially reduces the chance of user shock when terminals 106 are exposed.

In one embodiment, switches 406 may take form in mechanical switches, which are biased to the open position using springs (not shown). The actuation system 420 may take form in a mechanical system that engages and closes the mechanical switches when the battery pack 102 is received by the battery charger system. In another embodiment, switches 406 may take form in electrical switches (e.g., TRIACs) that are in data communication with a sensor, which detects the presence of battery pack 102 when it is received by the battery charger 200. The sensor can generate a signal that is used to close electrical switches 406 when the battery pack is detected. For example, a hall sensor 430 can generate a signal to close electric switches 406 when a magnet 432 in the battery pack 102 is detected. Or sensor 430 may take form in a photodetector that generates a signal when it detects light emitted by an LED 432. Additional switches 406 and actuation systems 420 are contemplated.

Figure 5:
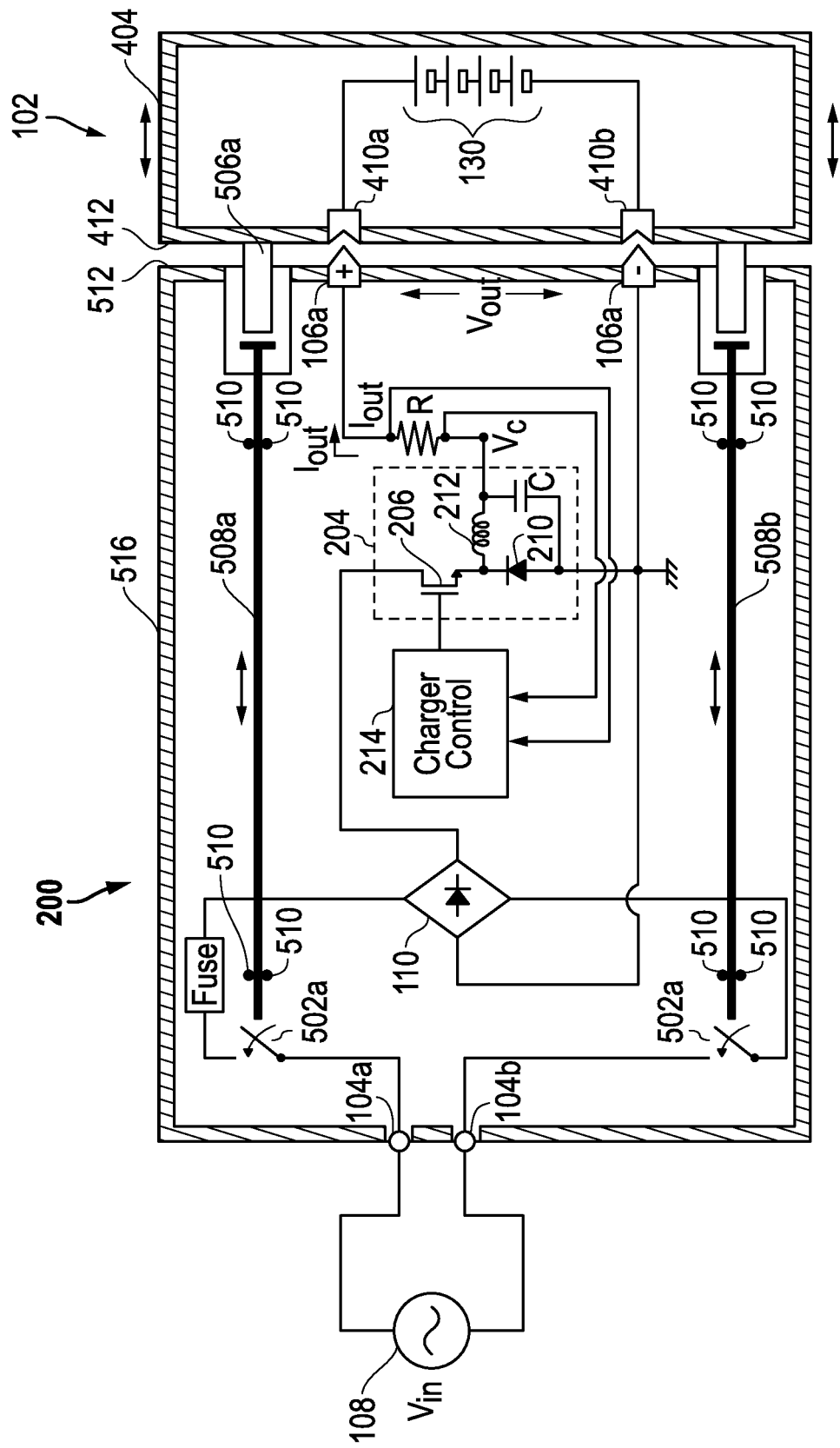
FIG. 5 is a diagram illustrating an embodiment of the transformer less based battery charger system shown in FIG. 4.

FIG. 5 illustrates one embodiment of the safety mechanism employed within FIG. 4. In this embodiment, mechanical switches 502 selectively couple the input terminals 104 to rectifier 110. Mechanical switches 502 are biased to the open position by springs (not shown). The actuation system includes plungers 508 that are laterally moveable between first and second positions. Plungers 508 are shown biased in the first position by springs (not shown). Fixed guides 510 limit plungers 508 to lateral movement between the first and second positions. Plungers 508 are configured to engage respective protrusions 506 that extend from a housing 404 of battery pack 102. As the battery pack is received by the battery charger, protrusions 506 engage and push respective plungers 508 towards its second position. As the plungers 508 move towards the second position, plungers 508 engage mechanical switches 502 and eventually close them. When closed, switches 502 create electrical connections between the input terminals 104 and bridge rectifier 110. With plungers 508 in the second position, Iout can flow to battery cells 130 via mated terminals 106 and 410.

While battery pack 102 is received by battery charger 200, the outer surfaces 512 and 412 of housings 516 and 404, respectively, which are made from plastic or other non-conducting material, engage and enclose mated terminals 106 and 410. In this configuration, the housings 404 and 516 prevent inadvertent user contact with either terminals 106 or 410 while they are energized. When the battery pack 102 is released from the battery charger, springs force plungers 508 back to the first position in which they no longer engage switches 502. Separate springs then force switches 502 to the open position, thereby disconnecting bridge rectifier 110 from the high voltage AC input Vin.

MCUs can be employed in charger systems for monitoring and managing a battery charging process such as the three-stage process described above. With continuing reference to FIGS. 2-5, FIGS. 6 and 7 illustrate example embodiments in which control circuit 214 includes an MCU for monitoring and managing a process for charging a battery pack. FIG. 8 illustrates an example embodiment in which a battery pack includes an MCU for monitoring and managing a charging process.

Figure 6:
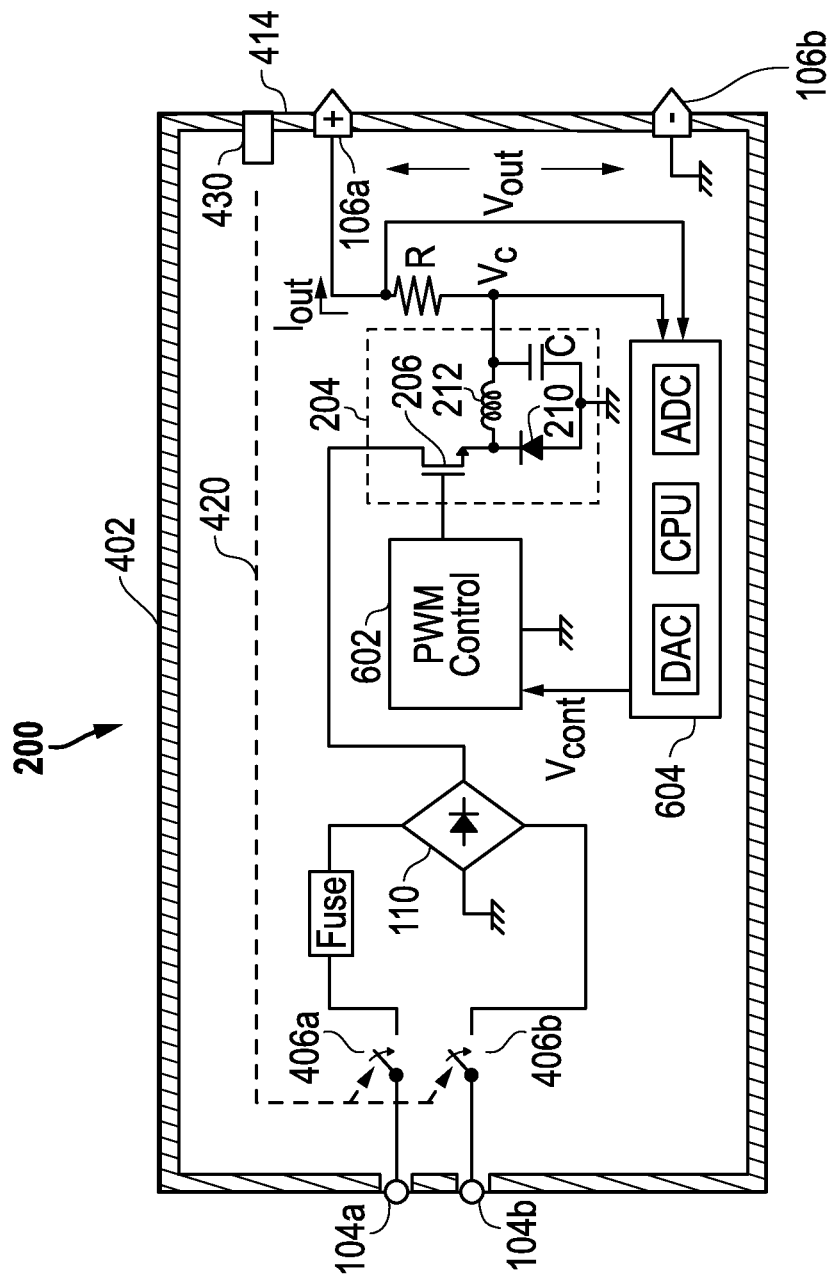
FIG. 6 is a diagram illustrating an embodiment of the transformer less based battery charger system shown in FIG. 4.

FIG. 6 illustrates one embodiment of the charger system 200 shown in FIG. 4. The control circuit 214 in FIG. 6 includes a PWM control circuit 602 coupled to an MCU 604. PWM control circuit 602 generates a PWM signal based on a control voltage Vcont that is generated by MCU 604. In one embodiment, the duty cycle of the PWM signal depends on Vcont. The magnitude of Vout and/or Iout will change with a change in Vcont and thus the duty cycle. MCU 604 includes a central processing unit (CPU) that monitors and manages the process for charging battery pack 102 in accordance with an embedded program stored in memory (not shown). MCU 604 also includes an analog-to-digital converter (ADC) and a digital-to-analog converter (DAC). The ADC converts analog signals Vc and Vout into digital equivalents. The CPU can calculate Iout as a function of Vc, Vout and the known resistive value of R. The CPU monitors Iout and/or Vout during the process of charging battery pack 102. For example, the CPU monitors Iout during the QC/constant-current stage of recharging battery pack 102. If the magnitude of Iout deviates from a predetermined value during this stage, CPU will adjust the magnitude of Vcont provided to PWM driver circuit 602, which in turn results in an adjustment in Iout. Vcont is converted into an analog equivalent using the DAC before Vcont is provided to PWM driver circuit 602.

Figure 7:
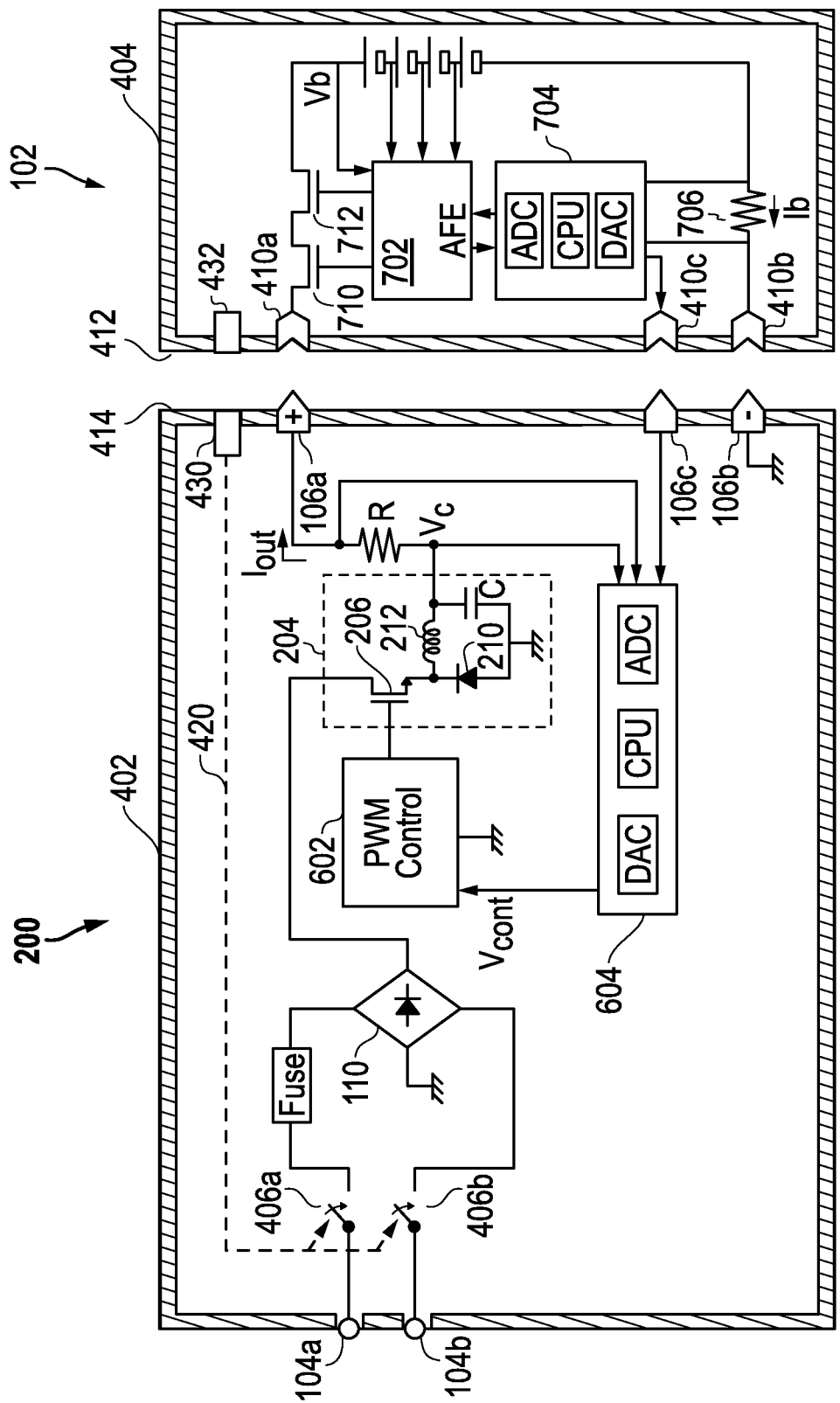
FIG. 7 is a diagram illustrating an embodiment of the transformer less based battery charger system shown in FIG. 4.
Figure 8:
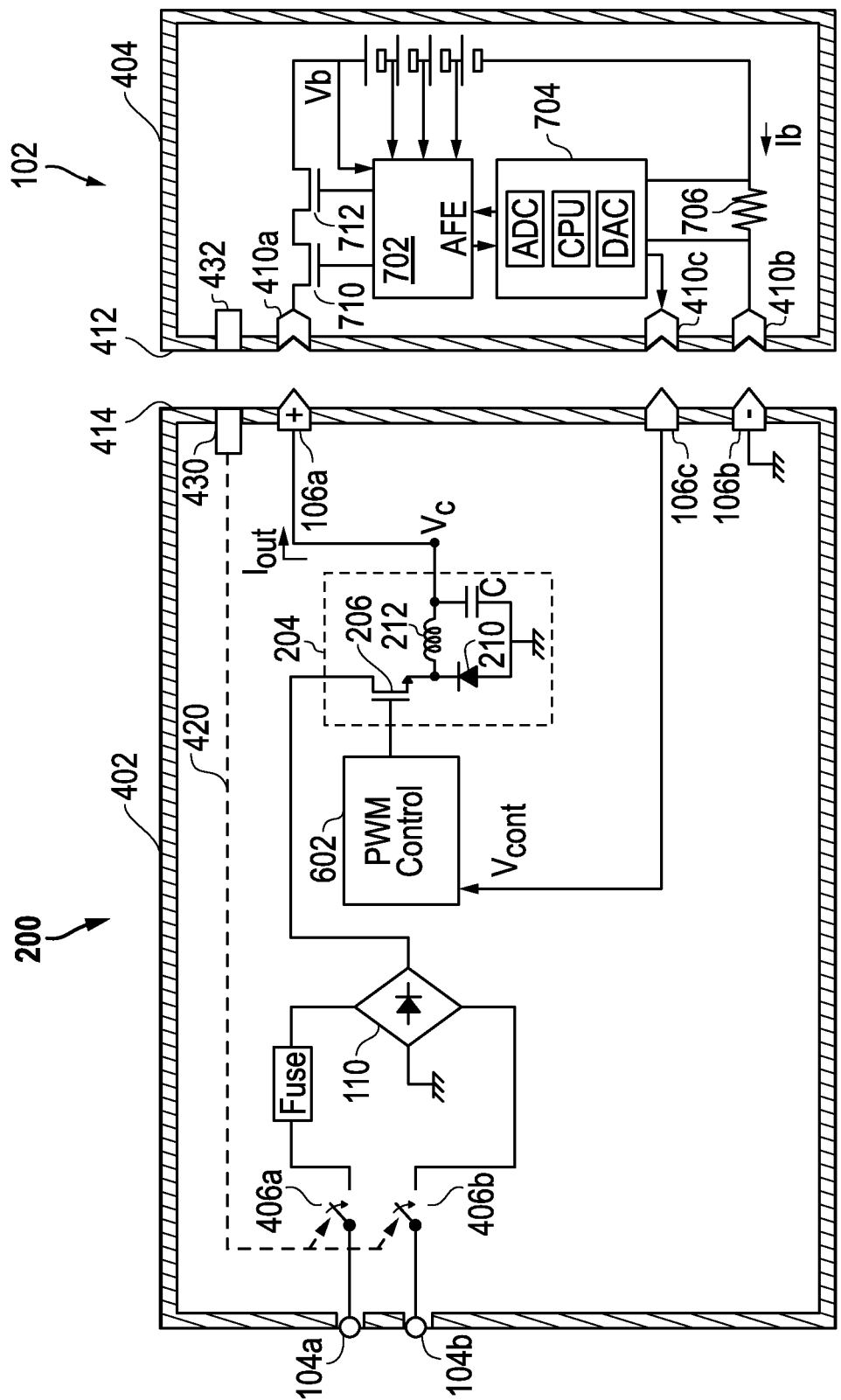
FIG. 8 is a diagram illustrating an embodiment of the transformer less based battery charger system shown in FIG. 7.

FIG. 7 illustrates the charger system 200 shown in FIG. 6 with an added terminal 106c, which is configured to receive signals from battery pack 102. FIG. 7 also shows battery pack 102 with an added fuel gauge, which includes an analog-front-end (AFE) 702 and MCU 704. AFE 702 includes sensors and circuits needed to interface the sensors to MCU 704. The AFE is coupled to battery cells 130 and can provide signals to MCU 704 that represent parameters thereof. For example, AFE 702 can sense the collective voltage Vb across battery cells 130, voltages across individual battery cells, temperatures of individual battery cells, etc. MCU 704 can monitor cells 130 via signals provided by AFE 702 and a signal that represents the current flow through resistor 706. For example, MCU 704 can monitor the temperatures of the lithium ion battery cells 130 to insure they are operating within a safe range. MCU 704 can protect battery cells 130 by controlling the current flowing into or out of battery cells 130 via AFE 702 and transistors 710 and 712. For example, MCU 704 can generate a signal that instructs the AFE 702 to open one or more of transistors 710 or 712 if the MCU determines one or more of the battery cells 130 is not operating within predetermined parameters.

MCUs 604 and 704 are in data communication with each other via terminals 106c and 410c when the battery pack 102 is received by the charger system 200. MCU 704 is configured to transmit one or more signals to MCU 604. The one or more signals, in analog or digital form, may include Vb, the voltage across battery cells 130, the voltages across individual battery cells, temperature of individual battery cells, and/or Ib, the current flowing through resistor 706. MCU 604 can process the one or more signals received from MCU 704 as battery pack 102 is being charged. Or, MCU 604 can process the one or more signals from MCU 704 along with signals representing Vout and Iout. Either way, MCU 604 processes the signals to generate control voltage Vcont, which is used by PWM control circuit 602 for adjusting the PWM signal it generates during the charging process. In this manner, MCU 604 can monitor and manage the process for charging battery pack 102 using signals provided by the battery pack.

FIG. 8 illustrates the charger system 200 and battery pack 102 shown in FIG. 7 with modifications. MCU 604 is removed from battery charger 200. In this embodiment, the charging process is monitored and managed by MCU 704 based on signals (e.g., Vb, temperature, etc.) provided by AFE 702 and/or current flow through resistor 706. More particularly, MCU 612 generates Vcont, which is subsequently transmitted to PWM control 602 via terminals 106c and 410c. The elimination of MCU 604 reduces the overall cost of battery charger 200 shown in FIG. 8 when compared to the battery charger shown in FIG. 7.

The various embodiments described above include a fuse positioned between the input terminal 104a and rectifier 110, and designed to open and permanently disconnect input terminal 104a from rectifier if the charger 200 operates in an unsafe mode. In an alternative embodiment, the fuse could be located between an output terminal of DC-DC controller 204 and output terminal 106a. In this alternative embodiment, the fuse can be "opened" by an over voltage detection circuit (not shown) that includes a zener diode and a thyristor. The zener diode can be coupled in series with resistors, the combination of which is coupled between the output terminals 106. The zener diode can be configured to conduct current if Vout exceeds, for example, 50V. Current flow through the zener and across a resistor in series therewith, creates a voltage at the resistor that activates the thyristor, which is connected to the fuse. The activated thyristor draws enough current to open the fuse, which disconnects output terminal of the DC-DC converter 204 and output terminal 106*a*.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A apparatus comprising:
   battery charger comprising:
      input terminals for receiving an AC voltage;
      output terminals for receiving terminals of a rechargeable battery pack;
      a non-isolated DC-DC converter coupled between the input terminals and the output terminals;
      a device for selectively coupling the input terminals to the output terminals;
      wherein the device couples the input terminals to the output terminals when the rechargeable battery pack terminals are received by the output terminals;
      wherein the device decouples the input terminals from the output terminals when the rechargeable battery pack terminals are separated from the output terminals;
      wherein the device is external to the non-isolated DC-DC converter.

2. The apparatus of claim 1:
   wherein the device comprises a switch coupled between one of the input terminals and one of the output terminals;
   wherein the switch closes when the terminals of the rechargeable battery pack are received by the output terminals;
   wherein the switch opens when the terminals of the rechargeable battery pack are separated from the output terminals.

3. The apparatus of claim 1:
   wherein the device comprises a switch coupled between one of the input terminals and an input to the non-isolated DC-DC converter;
   wherein the switch closes when the terminals of the rechargeable battery pack are received by the output terminals;
   wherein the switch opens when the terminals of the rechargeable battery pack are separated from the output terminals.

4. The apparatus of claim 1 wherein the battery charger further comprises:
   a rectifier coupled between the input terminals and the non-isolated DC-DC converter;
   wherein the device comprises a switch coupled between one of the input terminals and the rectifier;
   wherein the switch closes when the terminals of the rechargeable battery pack are received by the output terminals;
   wherein the switch opens when the terminals of the rechargeable battery pack are separated from the output terminals.

5. The apparatus of claim 2 wherein the switch comprises one of a mechanical switch, an optical switch, a magnetic switch, or an electrical switch.

6. The apparatus of claim 1 wherein the battery charger further comprises:
   a battery charger housing that contains the non-isolated DC-DC converter;
   wherein the output terminals are exposed through respective openings in the battery charger housing when the battery charger and rechargeable battery pack are separated from each other.

7. The apparatus of claim 1 wherein the battery charger comprises a communication terminal for receiving a communication terminal of the rechargeable battery pack.

8. The apparatus of claim 3 further comprising the rechargeable battery pack, wherein the rechargeable battery pack comprises:
   the rechargeable battery pack communication terminal;
   an MCU coupled to rechargeable battery pack communication terminal;
   wherein the rechargeable battery pack communication terminal is configured to transmit a signal generated by the MCU to the battery charger communication terminal when the rechargeable battery pack communication terminal is received by the battery charger communication terminal.

9. The apparatus of claim 8 wherein a magnitude of an output voltage generated at the output terminals of the battery charger depends on the signal generated by the MCU of the rechargeable battery pack.

10. The apparatus of claim 4 wherein the input terminals, the output terminals, the non-isolated DC-DC converter, and the rectifier are all mounted on a printed circuit board.

11. A method comprising:
   connecting input terminals of a battery charger to a source of AC power, wherein the battery charger comprises a non-isolated DC-DC converter;
   connecting output terminals of the battery charger to respective terminals of a rechargeable battery pack;
   closing a switch that couples one of the input terminals or one of the output terminals to the non-isolated DC-DC converter in response to connecting the rechargeable battery pack terminals to the battery charger output terminals, wherein the switch is a device that is external to the non-isolated DC-DC converter;
   charging one or more battery cells of the rechargeable battery pack with DC power provided at the output terminals thereof in response to closing the switch;
   disconnecting the output terminals of the battery charger to respective terminals of a rechargeable battery pack;
   opening the switch in response to disconnecting the rechargeable battery pack terminals from the battery charger output terminals while the input terminals of the battery charger are connected to the AC power source.

12. The method of claim 11 further comprising:
   monitoring the non-isolated DC-DC converter for malfunction;
   in response to detecting a malfunction of the non-isolated DC-DC converter, disconnecting the one of the input terminals to the one of the output terminals.

13. The method of claim 11 wherein the output terminals extend from a non-conductive housing that contains the non-isolated DC-DC converter.

* * * * *